(12) United States Patent
Lucka et al.

(10) Patent No.: US 11,835,018 B2
(45) Date of Patent: Dec. 5, 2023

(54) MAGNETICALLY LATCHING VALVE FOR FUEL VAPOR MANAGEMENT SYSTEMS AND SYSTEMS INCORPORATING SAME

(71) Applicant: DAYCO IP HOLDINGS, LLC, Troy, MI (US)

(72) Inventors: Kevin W. Lucka, Southfield, MI (US); Donald P. Tinsley, III, Huntington Woods, MI (US); Matthew C. Gilmer, South Lyon, MI (US); James H. Miller, Ortonville, MI (US)

(73) Assignee: Dayco IP Holdings, LLC, Roseville, MI (US)

( * ) Notice: Subject to any disclaimer, the term of this patent is extended or adjusted under 35 U.S.C. 154(b) by 0 days.

(21) Appl. No.: 17/446,842

(22) Filed: Sep. 3, 2021

(65) Prior Publication Data

US 2022/0074370 A1 Mar. 10, 2022

Related U.S. Application Data

(60) Provisional application No. 63/075,228, filed on Sep. 7, 2020.

(51) Int. Cl.
*F02M 25/08* (2006.01)
*F02M 35/10* (2006.01)
(Continued)

(52) U.S. Cl.
CPC ......... *F02M 25/0836* (2013.01); *F02B 37/16* (2013.01); *F02B 37/162* (2019.05);
(Continued)

(58) Field of Classification Search
CPC ............ F02M 25/0836; F02M 25/0845; F16K 31/0655; F16K 31/0675; F16K 31/082
See application file for complete search history.

(56) References Cited

U.S. PATENT DOCUMENTS

| 3,022,450 A | * | 2/1962 | Chase, Jr. ............. | H01F 7/1615 |
| | | | | 361/194 |
| 4,327,344 A | * | 4/1982 | Luckenbach ........... | H01F 7/124 |
| | | | | 335/253 |

(Continued)

FOREIGN PATENT DOCUMENTS

| DE | 2455792 A1 | 8/1976 |
| GB | 2288795 A | 11/1995 |

(Continued)

OTHER PUBLICATIONS

PCT/US2021/071360, International Search Report and Written Opinion, dated Dec. 29, 2021 (14 pages).

*Primary Examiner* — John M Zaleskas
(74) *Attorney, Agent, or Firm* — FisherBroyles, LLP; Susan M. Oiler

(57) ABSTRACT

Magnetic latching valves have a housing with first and second ports in controlled fluid communication with one another. Enclosed within the housing is a linearly translatable armature within a solenoid. The armature is movable between open and closed positions and is connected to a poppet valve. A permanent magnet is fixedly seated at a position for magnetically latching the armature in the open position, and a spring is seated with a first end against the poppet valve and a second end against the housing. The spring biases the poppet valve closed when the armature is in the closed position and has a pre-selected spring rate that mechanically relieves pressure if the spring rate is exceeded. The armature is moved to the open position after a pulse of voltage to the solenoid and is in an unpowered state thereafter. Vehicle fuel refueling system are disclosed that include a magnetic latching valve.

9 Claims, 4 Drawing Sheets

(51) Int. Cl.
*F16K 31/06* (2006.01)
*F16K 31/08* (2006.01)
*F02B 37/16* (2006.01)

(52) U.S. Cl.
CPC ... *F02M 35/10222* (2013.01); *F16K 31/0675* (2013.01); *F16K 31/082* (2013.01); *F02M 2025/0845* (2013.01)

(56) References Cited

U.S. PATENT DOCUMENTS

| | | | |
|---|---|---|---|
| 4,383,234 A | 5/1983 | Yatsushiro | |
| 4,700,682 A * | 10/1987 | Ota | F02M 25/0836 123/516 |
| 4,700,750 A * | 10/1987 | Cook | F02M 25/0836 123/518 |
| 4,703,737 A * | 11/1987 | Cook | F02M 25/0836 123/518 |
| 5,005,550 A * | 4/1991 | Bugin, Jr. | F02M 25/089 123/520 |
| 5,488,340 A * | 1/1996 | Maley | H01F 3/00 335/253 |
| 5,535,725 A * | 7/1996 | Baker | F02M 25/0836 123/520 |
| 5,599,003 A * | 2/1997 | Seemann | H01F 7/124 251/129.2 |
| 5,803,056 A * | 9/1998 | Cook | F02B 23/104 123/520 |
| 5,915,665 A * | 6/1999 | Paese | E03C 1/05 251/30.04 |
| 6,076,550 A * | 6/2000 | Hiraishi | H01F 7/1615 137/550 |
| 6,199,587 B1 * | 3/2001 | Shlomi | F16K 31/0627 137/625.5 |
| 6,262,648 B1 * | 7/2001 | Lammers | H01H 33/6662 335/229 |
| 6,598,623 B2 * | 7/2003 | Weldon | F02M 25/0836 137/495 |
| 7,011,076 B1 | 3/2006 | Weldon et al. | |
| 8,789,557 B2 | 7/2014 | Muller-Riederer et al. | |
| 9,388,775 B2 | 7/2016 | Bolger et al. | |
| 9,534,704 B2 | 1/2017 | Hampton et al. | |
| 9,683,523 B2 | 6/2017 | Balsdon et al. | |
| 9,827,963 B2 | 11/2017 | Fletchet et al. | |
| 9,890,747 B2 | 2/2018 | Williams et al. | |
| 9,956,867 B2 | 5/2018 | Ognjanovski, Jr. et al. | |
| 10,253,900 B2 | 4/2019 | Jefford et al. | |
| 2001/0017160 A1 * | 8/2001 | Ishigaki | F16K 31/082 137/520 |
| 2002/0088441 A1 * | 7/2002 | Weldon | F16K 31/0655 123/520 |
| 2002/0088957 A1 * | 7/2002 | Weldon | F16K 31/0651 251/129.15 |
| 2003/0042452 A1 * | 3/2003 | Burke | F02M 25/0836 251/129.15 |
| 2004/0040547 A1 * | 3/2004 | Ivens | F16K 31/0655 123/520 |
| 2004/0055583 A1 * | 3/2004 | Everingham | F02M 25/0836 123/520 |
| 2005/0046531 A1 * | 3/2005 | Moyer | F16K 31/082 335/256 |
| 2006/0065250 A1 * | 3/2006 | Weldon | F16K 31/082 123/516 |
| 2008/0297288 A1 * | 12/2008 | Irwin | H01F 7/1615 335/254 |
| 2009/0242815 A1 * | 10/2009 | Chen | F16K 31/0655 251/129.21 |
| 2009/0256093 A1 * | 10/2009 | Chen | F16K 31/0675 251/129.15 |
| 2011/0240145 A1 * | 10/2011 | Pifer | F16K 31/0655 137/487.5 |
| 2011/0284781 A1 * | 11/2011 | Keller | F16K 37/005 251/129.15 |
| 2012/0055943 A1 * | 3/2012 | Muller-Riederer | F16K 31/0655 220/745 |
| 2013/0009083 A1 * | 1/2013 | Ozaki | H01F 7/1607 251/129.15 |
| 2013/0112290 A1 * | 5/2013 | Gerlich | B60K 15/035 137/487.5 |
| 2014/0041737 A1 * | 2/2014 | Pifer | F16K 17/0413 137/487.5 |
| 2014/0197345 A1 * | 7/2014 | Graichen | F16K 31/084 251/324 |
| 2014/0264113 A1 * | 9/2014 | Grover | F16K 31/52408 251/129.15 |
| 2014/0353534 A1 * | 12/2014 | Graichen | F16K 3/18 251/213 |
| 2014/0366527 A1 * | 12/2014 | Fletcher | F02B 37/12 60/600 |
| 2015/0101577 A1 * | 4/2015 | Balsdon | F02M 25/0836 123/520 |
| 2015/0101677 A1 | 4/2015 | Balsdon et al. | |
| 2015/0101689 A1 * | 4/2015 | Balsdon | F02M 25/0836 137/551 |
| 2015/0102039 A1 | 4/2015 | Balsdon et al. | |
| 2015/0144819 A1 * | 5/2015 | Pifer | F16K 17/0413 251/129.15 |
| 2015/0316007 A1 * | 11/2015 | Williams | F16K 31/0655 137/583 |
| 2015/0345652 A1 * | 12/2015 | Jefford | F16K 31/082 251/129.15 |
| 2016/0201613 A1 * | 7/2016 | Ulrey | F02D 41/0032 123/520 |
| 2016/0201615 A1 * | 7/2016 | Pursifull | F02D 41/0032 123/520 |
| 2016/0222924 A1 * | 8/2016 | Dudar | F16K 37/0041 |
| 2016/0298579 A1 * | 10/2016 | Peters | F02M 25/08 |
| 2016/0305352 A1 * | 10/2016 | Pursifull | F02D 41/004 |
| 2016/0369713 A1 * | 12/2016 | Pursifull | F02B 33/44 |
| 2016/0369721 A1 * | 12/2016 | Pursifull | F02D 41/004 |
| 2016/0375759 A1 * | 12/2016 | Vulkan | F16K 17/04 137/15.08 |
| 2017/0050512 A1 * | 2/2017 | Ognjanovski, Jr. | F02M 25/08 |
| 2017/0159585 A1 * | 6/2017 | Pursifull | F02D 41/0007 |
| 2017/0191580 A1 * | 7/2017 | Pifer | F02D 41/004 |
| 2018/0094744 A1 * | 4/2018 | Graichen | F16K 3/18 |
| 2018/0099856 A1 | 4/2018 | Dudar | |
| 2018/0245708 A1 * | 8/2018 | Chiapasco | F16K 31/082 |
| 2019/0048829 A1 * | 2/2019 | Dayton | F16K 31/02 |
| 2019/0195383 A1 * | 6/2019 | Nasser | F16K 31/082 |
| 2019/0257441 A1 * | 8/2019 | Graichen | F16K 3/18 |
| 2020/0362799 A1 * | 11/2020 | Duffield, III | F02M 37/0029 |
| 2021/0088005 A1 * | 3/2021 | Dayton | H01F 7/081 |
| 2022/0290774 A1 * | 9/2022 | Zhang | F16K 31/0634 |

FOREIGN PATENT DOCUMENTS

| | | | |
|---|---|---|---|
| WO | WO-2019206460 A1 * | 10/2019 | F02M 25/0836 |
| WO | WO-2021026630 A1 * | 2/2021 | B60N 2/914 |

* cited by examiner

MAGNETICALLY LATCHING VALVE FOR FUEL VAPOR MANAGEMENT SYSTEMS AND SYSTEMS INCORPORATING SAME

RELATED APPLICATIONS

This application claims the benefit of U.S. Provisional application 63/075,228, filed Sep. 7, 2020, the entirety of which is incorporated herein by reference.

TECHNICAL FIELD

This application relates to a magnetically latching valve for fuel vapor management engine systems, more particularly, to a magnetically latching valve that magnetically latches in an open position during a vehicle refueling event, is normally closed during normal operation, and has an over-pressure relief function to protect the fuel tank structural integrity.

BACKGROUND

A valve that is primarily open when a customer needs to refuel a vehicle with a pressurized fuel system is commonly used in and is required for hybrid vehicles. The valve is located in the fuel vapor system between the fuel tank vapor dome and the fuel vapor carbon canister. The valve also provides a strictly mechanical function of opening and allowing flow under certain conditions to provide pressure relief under normal operating conditions to protect the fuel tank structural integrity.

A refueling valve allows vehicles to meet emissions regulations, such as set by the EPA, CARB, China 6, Euro 6.2 for Hybrid Electric Vehicles (HEVs) and Plug-In Hybrid Electric Vehicles (PHEVs), to keep the vapors stored within the fuel tank. The fuel vapor in a conventional non-hybrid system is allowed to have an open flow path to a fuel vapor canister because the engine will run enough to purge the fuel vapor canister. When the engine is in boost or vacuum, there is an opportunity to draw the fuel vapor off of the carbon particles in the fuel vapor canister and draw the fuel vapor into the intake manifold to be used as fuel. However, in a HEV or PHEV system, where the engine run time is very low, the fuel vapor canister would become saturated with fuel vapor and start emitting the fuel vapor into the atmosphere if there was an open path between the fuel tank and the canister. As such, a non-integrated refueling canister only system (NIRCOS) on HEVs and PHEVs is present, which has a valve that blocks fuel vapors from the fuel tank from flowing to the carbon canister, except during a refueling event.

There is a need to eliminate the hardware that indexes the valve position in commercially available mechanical latching valves in NIRCOS system of hybrid vehicles and, optionally, to provide a valve that can depressurize the fuel tank vapors to maintain the structural integrity of the fuel tank.

SUMMARY

In a first aspect, magnetic latching valves for use in a vehicle engine are disclosed herein. The magnetic latching valves have a housing with a first port and a second port in controlled fluid communication with one another. Enclosed within the housing is a linearly translatable armature seated within a solenoid and connected to a poppet valve, a permanent magnet fixedly seated within the housing at a position for magnetically latching the armature in the open position, and a spring seated around the connection of the armature to the poppet valve with a first end against the poppet valve and a second end against the housing. The armature is movable between an open position and a closed position, respectively, after a pulse of voltage to the solenoid. The permanent magnet latches or holds the armature in the open position after the pulse of voltage to the solenoid. The spring biases the poppet valve closed when the armature is in the closed position (moved to the closed position after a single pulse of voltage to the solenoid) and has a pre-selected spring rate that mechanically relieves pressure if the spring rate is exceeded. Except for the single pulses of voltage, the armature is in an unpowered state after translation to either of the open position or the closed position. In all embodiments, the housing defines a plug or plug receptacle in electrical communication with the solenoid.

In all embodiments, the spring can be a coil spring, but is not limited thereto. In one embodiment, when the spring is a coil spring, it is conically shaped.

In another aspect, systems for refueling a vehicle having an internal combustion engine are disclosed. The system includes a fuel tank in fluid communication with a filling tube, a magnetically latching valve disclosed herein controlling fluid communication between vapors in the fuel tank and a fuel vapor canister, and an intake manifold of an internal combustion engine in fluid communication with the fuel vapor canister. The magnetically latching valve is in electrical communication with a controller, and the controller opens the magnetically latching valve during vehicle refueling and closes the magnetically latching valve during normal operation. The pre-selected spring rate is selected to open the poppet valve at a threshold pressure of the vapors in the fuel tank below a structural integrity pressure of the fuel tank. In one embodiment, the pre-selected spring rate is set to prevent fuel nozzle shut offs during refueling In all embodiments, the solenoid can be in electrical communication with a plug or plug receptacle in the housing and the plug or plug receptacle is connected to a mating electrical connector in electrical communication with the controller or it may be directly electrically connected to the controller. The controller can include an H-bridge control system that reverse the polarity of the solenoid to move the armature between the open position and the closed position.

In one embodiment, the internal combustion engine is a hybrid engine, which can be a boosted system having a Venturi device in a bypass around a turbocharger or supercharger and the Venturi device has a suction port in fluid communication with the fuel vapor canister. In one embodiment, the system also includes a canister purge valve controlling fluid communication between the fuel vapor canister and the intake manifold. In this embodiment, the suction port of the Venturi device is in fluid communication with the fuel vapor canister, upstream of the canister purge valve.

In one embodiment, the magnetically latching valve is in a parallel flow relationship with a tank pressure control valve.

DETAILED DESCRIPTION

Figure 1:
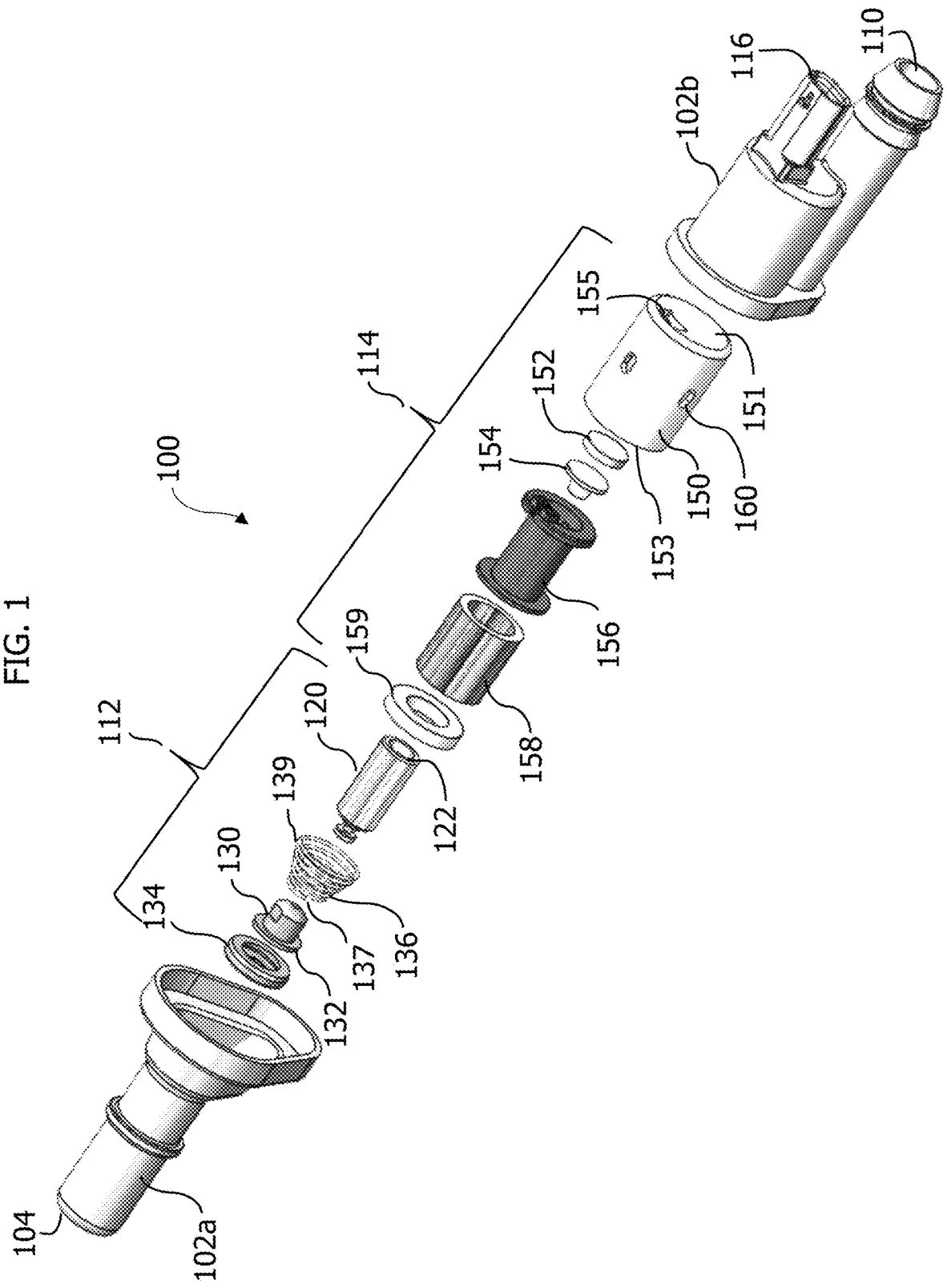
FIG. 1 is an exploded view of a magnetically latching valve.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof. In fuel vapor management systems, the fluid is typically a gas when moving through the magnetic latching valve.

Figure 2:
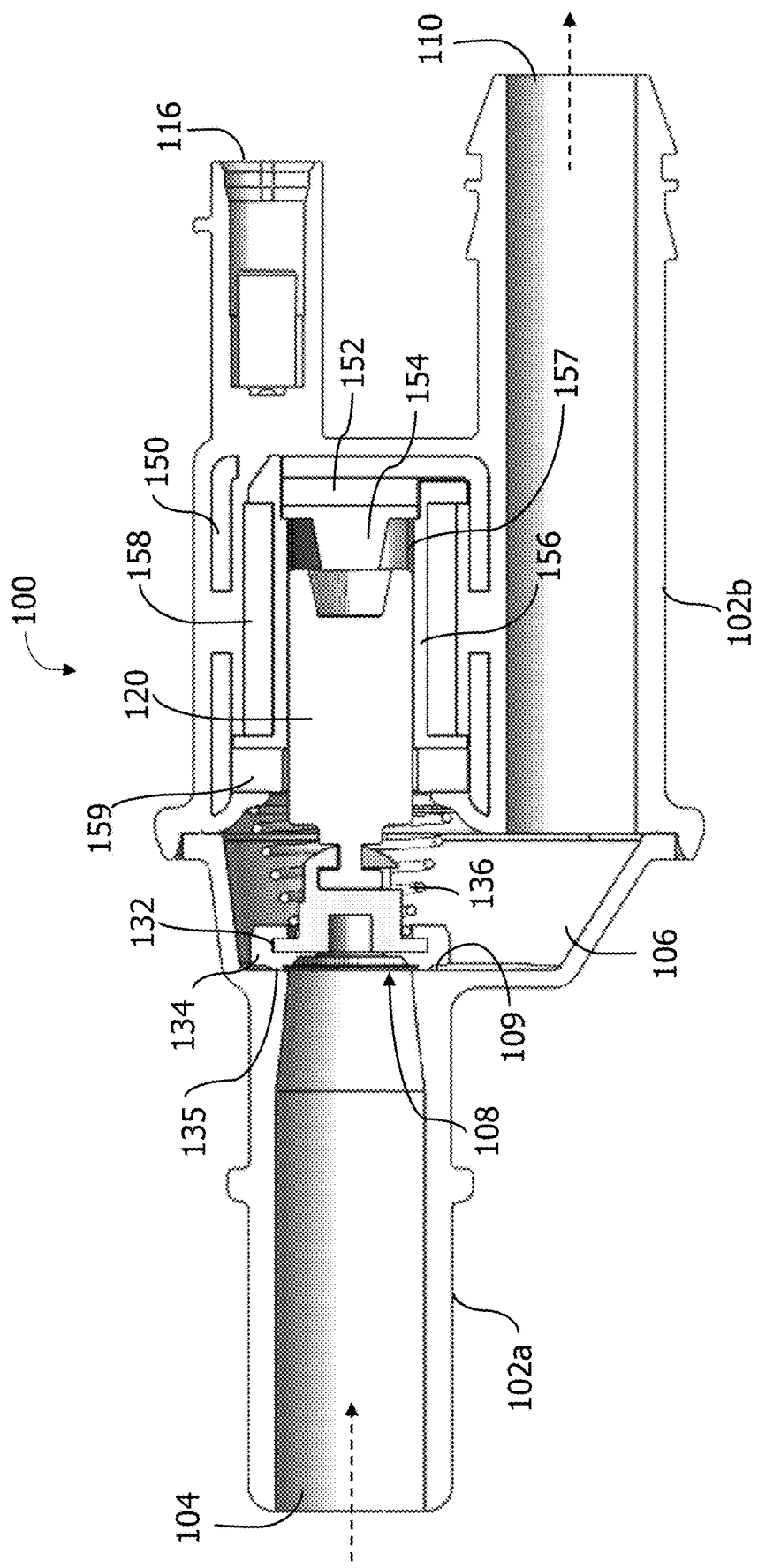
FIG. 2 is a longitudinal cross-section of the magnetically latching valve of FIG. 1 in an assembled state.

Referring to FIGS. 1 and 2, a magnetic latching valve 100 for a fuel vapor management system is shown. The magnetic latching valve 100 has a housing 102 defined in two parts, a base 102a and a cover 102b, that are mated with a fluid tight seal as shown in FIG. 2. The fluid tight seal may be formed by heat welding, laser welding, a snap-fit, an interference fit, an adhesive bond, or other known or herein after developed methods. The base 102a includes a first port 104 in fluid communication with a chamber 106 defined by the housing 102. The junction of the first port 104 with the chamber 106 defines a valve opening 108. The cover 102b includes a second port 110 in fluid communication with the chamber 106. The fluid communication between the first port 104 and the second port 110 is controlled by a linearly translatable armature 120 seated within a solenoid 158 and connected to a poppet valve 130 that makes a fluid tight seal with the valve seat 109 defining the valve opening 108 when the magnetic latching valve 100 is in a closed position as shown in FIG. 2. The cover 102b includes an electrical plug or plug receptacle 116 that is in electrical communication with the solenoid 158. The electrical plug or plug receptacle 116 is connectable to a mating electrical connector (not shown) in electrical communication with a controller 280 (FIG. 3) of the fuel vapor management system or an internal combustion engine. Each of the exterior surfaces of the first port 104 and the second port 110 may include connecting features, such as flanges, ribs, grooves, barbs, or the like to attach a hose thereto or a duct of a device within the engine system.

With reference to FIG. 1, the valve mechanism enclosed within the housing 102 can be characterized as having moving components 112 and stationary components 114. The moving components 112 includes the armature 120, the poppet valve 130, an annual seal ring 134 seated over a radially protruding flange 132 of the poppet valve 130, and a spring 136 biasing the poppet valve 130 toward the valve opening 108. The stationary components 114 include a solenoid housing 150, having a closed end 151 and an open end 153, in which is seated, in order, a permanent magnet 152, a stop 154 that receives a first end 122 of the armature 120, a bobbin 156 having a solenoid 158 seated thereon, and a cover 159 fixedly connected to the open end of the solenoid housing 150. The armature 120 is linearly translatable within the solenoid 158, more specifically within the hollow core 157 of the bobbin 156, and it can move between an open position and a closed position, respectively, after a pulse of voltage is supplied to the solenoid. The permanent magnet 152 is fixedly seated within the housing 102, and respectively the solenoid housing 150, at a position for magnetically latching the armature 120 in the open position after one pulse of voltage to the solenoid 158 moves the armature 120 to the open position. The spring 136 is seated around the connection of the armature 120 to the poppet valve 130 and has a first end 137 against the poppet valve 130 and a second end 139 against either the cover 102b or the solenoid housing 150. The spring 136 biases the poppet valve 130 toward the valve opening 108 when the armature is in the closed position (FIG. 2) and has a pre-selected spring rate that mechanically relieves pressure if the spring rate is exceeded while the armature 120 is in the closed position.

The housing 102 is typically plastic, such as, but not limited to, nylon 6, nylon 4/6, nylon 6/6 and/or polyoxymethylene. Plastic embodiments enable the housing 102 to be produced using molding techniques, including but not limited to injection molding.

As best seen in FIG. 1, the solenoid housing 150 includes keys or keyways mateable to the opposite feature inside the cover 102b and/or a plurality of boreholes 160 radially through the side thereof for registration with the cover 102b. In one embodiment, the cover 102b is over molded to the solenoid housing 150 and the plastic material has entered through the plurality of boreholes to connect the cover 102b to the solenoid housing 150. The solenoid housing 150 includes an opening 155 in the closed end 151 thereof for electrical wiring to pass therethrough to connect the solenoid 158 to the electrical plug or plug receptacle 116.

In the embodiment of FIGS. 1 and 2, the spring 136 is a coil spring. In one embodiment, the coil spring is conically shaped and has the smaller end seated against the poppet valve 130. In all embodiments, the spring is tuned to have a pre-selected spring rate set to open the poppet valve 130 at a threshold pressure of the vapors in the fuel tank below a structural integrity pressure of the fuel tank. The structural integrity pressure of the fuel tank is a value above which the fuel tank could experience a rupture. While a coil spring is illustrated, the spring 136 is not limited thereto.

The annular seal 134 of the poppet valve 130 can be overmolded to the flange 132 thereof or elastically stretched to fit thereover. Referring to FIG. 2, the annular seal 134 can have an axially facing protruding annular ring 135 facing the valve opening 108 to enhance the fluid tight seal therebetween. The annular seal 134 may be constructed of a fluoroelastomer. Suitable fluoroelastomers include, but are not limited to, polyvinyl fluoride, polyvinylidene fluorides, polytrifluoromonochloroethylene, polytetrafluoroethylene, polyhexafluoropropylene, polydifluoroethylene, polytetrafluoroethylene, fluorosilicone, ethylene-tetrafluoroethylene copolymer, hexafluoropropylene-tetrafluoroethylene copolymer, hexafluoropropylene-difluoroethylene copolymer, perfluoroalkoxytetrafluoroethylene copolymer, tetrafluoroethylene-hexafluoropropylene-vinylidene fluoride terpolymer, or other commercially available elastomeric material that will provide seal integrity under a fuel management system's operating conditions.

In operation, the magnetically latching valve 100 is normally closed, with the spring 136 biasing the poppet valve into a fluid tight seal against the valve opening 108. When commanded open, such as during a refueling of a vehicle, a first pulse of voltage is applied to the solenoid 158 to linearly translate the armature 120 to the open position. Then, in an unpowered state, the permanent magnet 152 holds the armature by magnetic attraction thereto with the spring 136 in a compressed state. As is understood, the armature 120 is made of a ferromagnetic material in order to be magnetically attracted to the permanent magnet 152. Subsequently, when the valve needs to be closed, a second pulse of voltage is applied to the solenoid 158 that reverses the polarity of the solenoid 158, so that the armature 120 is moved away from the permanent magnet 152. In the closed position, the valve is again in an unpowered state with the spring 136 biasing the poppet valve into a fluid tight seal against the valve opening 108. As such, the magnetically latching valve requires very little power.

The magnetically latching valve 100 can be operated with an H-Bridge control system that reverses polarity to allow the armature to move between the two positions, i.e., the open position and the closed position. In one embodiment, the H-Bridge control system is part of the controller 280 shown in FIG. 3. In another embodiment, the control system can be stored in a microprocessor housed within the magnetically latching valve 100.

Figure 3:
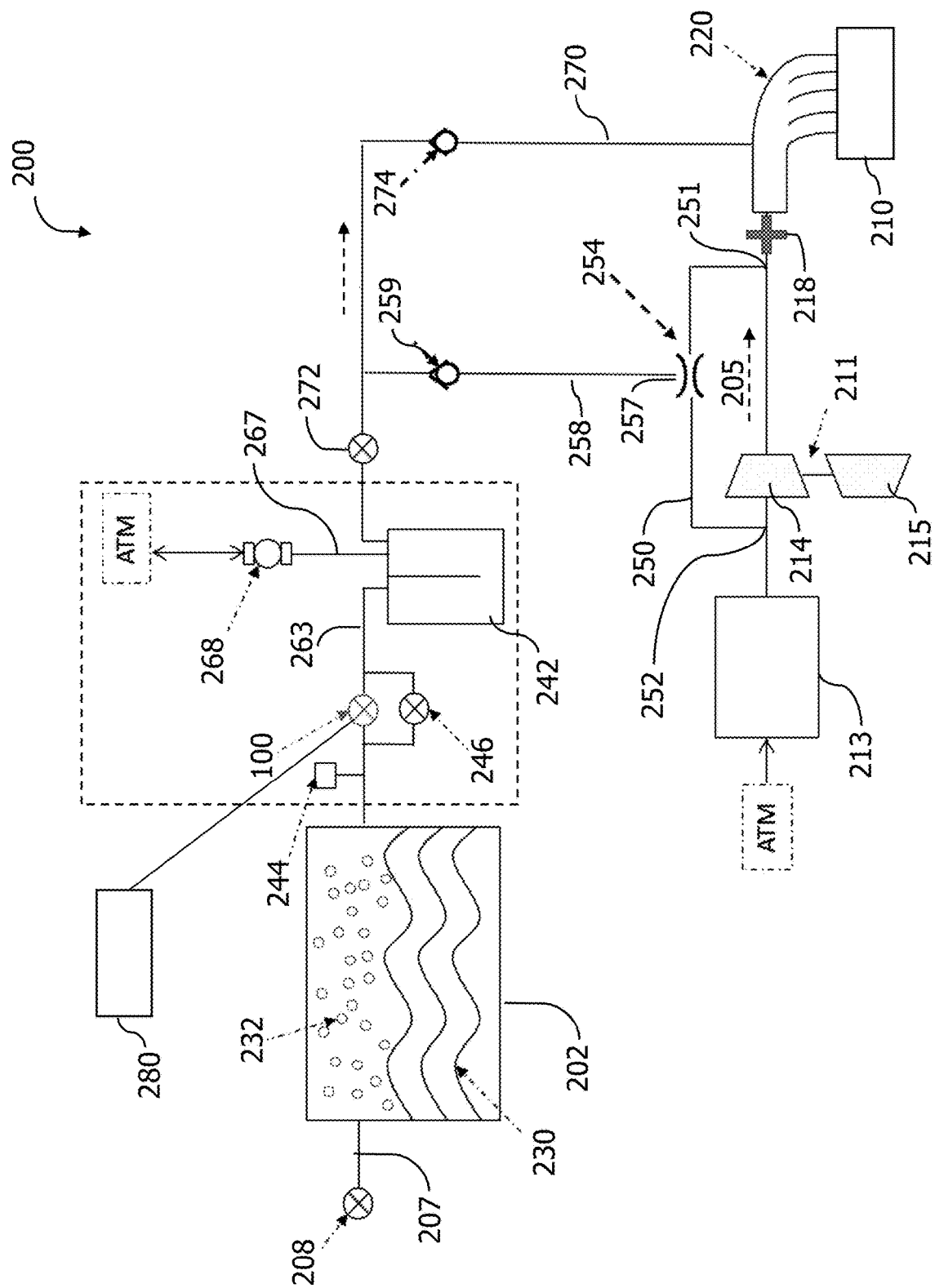
FIG. 3 is a schematic illustration of a turbocharged hybrid engine system having a magnetically latching valve of FIG. 1 as a refueling valve between the fuel tank and the canister.

Referring now to FIG. 3, a hybrid electric vehicle engine system 200 is shown, which is a turbocharged or supercharged system having a turbocharger, a supercharger or the like, referred to herein collectively as turbocharger 211. The hybrid vehicle engine can be a plug-in engine system. The engine system 200 is configured for combusting fuel vapor from a fuel tank 202 which accumulates in at least one component thereof and includes a multi-cylinder internal combustion engine 210 using a non-integrated refueling canister only system (NIRCOS). The engine system 200 receives atmospheric air (ATM) from an air intake, which may include an air filter 213 (also known as an air cleaner). The turbocharger 211 has a turbine 215 operating a compressor 214, which receives air from the air intake air filter 213, compresses the air, and directs a flow of compressed air 205 (sometimes called "boosted" air) downstream, optionally, through a charge air cooler or intercooler (not shown) and then to a throttle 218. The throttle 218 controls fluid communication between the compressor 214 and the intake manifold 220 of the engine 210. The throttle 218 is operable using known techniques to vary an amount of intake air provided to the intake manifold 220 and the cylinders of the engine.

A bypass conduit 250 is included around the turbocharger 211. The bypass conduit 250 has an entrance 251 downstream of the compressor 214 and upstream of the throttle 218 and has an exit 252 upstream of the compressor 214. The entrance 251 may be upstream or downstream of an intercooler (not shown). The bypass conduit 250 includes a Venturi device 254 for generating vacuum. The Venturi device 254 has a motive entrance in fluid communication with the entrance 251, a discharge exit in fluid communication with the exit 252, and a suction portion 257 in fluid communication with the fuel tank 202 and the fuel vapor canister 242 via a suction conduit 258, upstream of a canister purge valve 272. The Venturi device 254 may have the particulars of any of the devices in any of Applicant's co-pending applications or granted patents, e.g., U.S. Pat. Nos. 9,827,963 and 9,534,704, and may include an integral check vale 259 preventing flow from the Venturi device 254 through the suction port 257 toward the fuel tank 202. Otherwise, the check valve 259 may be a separate check valve in the suction conduit 258.

Still referring to FIG. 3, the fuel tank 202 is a reservoir for holding fuel 230 and fuel vapors 232 to be supplied to the internal combustion engine 210 via a fuel deliver system such as a fuel pump (not shown) and includes a filler neck 207 and a filler valve 208 that receives a refill nozzle. The fuel tank 202 is operatively connected to a fuel vapor canister 242 for fluid communication of fuel vapors 232 therewith through a first conduit 263. Fuel vapor canister 242 contains carbon, and such canisters are well known. The first conduit 263 includes the magnetically latching valve 100 described above. The magnetically latching valve 100 has the first port 104 in fluid communication with the fuel tank 202 and the second port 110 in fluid communication with the fuel vapor canister 242. The magnetically latching valve 100 controls fluid communication between the fuel tank's fuel vapors 232 and the fuel vapor canister 242. A pressure sensor 244 may be present between the fuel tank and the magnetically latching valve 100 to detect the high pressure of the fuel tank vapors 232. Additionally, a fuel tank pressure control valve 246 can be present in a parallel flow relationship, i.e., in a bypass loop around the magnetically latching valve 100. One embodiment of a fuel tank pressure control valve 246 is disclosed in co-pending U.S. application Ser. No. 16/875,601.

The fuel vapor canister 242 has a second conduit 267 in fluid communication with the atmosphere. A canister vent valve or an evaporative leak check monitor 268 is present in the second conduit 267 and controls the fluid communication between the fuel vapor canister 242 and atmosphere. A canister purge valve 272 is present in the conduit 270 between the fuel vapor canister 242 and the intake manifold 220 to control fluid communication therebetween. An additional check valve 274 may also be present between the canister purge valve 270 and the intake manifold 220 to prevent fluid from flowing from the intake manifold 220 to the fuel vapor canister 242.

A controller 280 can regulate the operation of the engine 210 and its fuel delivery as well as other vehicle systems. The controller 280 is electrically connected to the magnetically latching valve 100 via the electrical plug or electrical receptacle 116 of the valve 100 as a direct or indirect connection.

Figure 4:
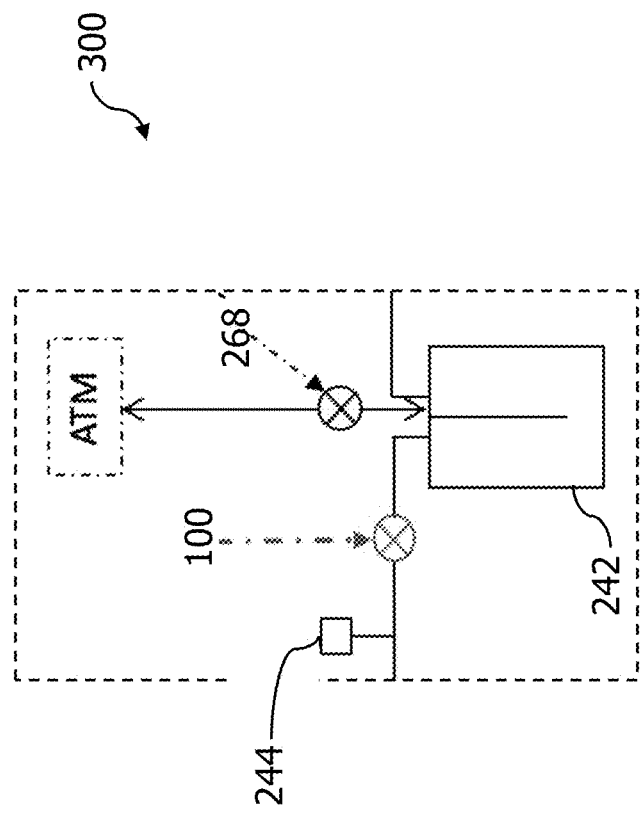
FIG. 4 is a schematic illustration of an alternative configuration for the fuel vapor portion of FIG. 3 for a conventional gasoline engine having the magnetically latching valve of FIG. 1 as a vapor blocking valve between the refuel tank and the canister.

Turning now to FIG. 4, the magnetically latching valve 100 is compatible with normal gasoline systems as well as high ethanol fuel systems 300, i.e., non-hybrid engine systems, to provide high vapor flow across the valve seat during a refueling event. In such engine systems, the portion inside the dashed box in FIG. 3 is replaced with the configuration shown in FIG. 4. Here, the magnetically latching valve 100 is in fluid communication between the fuel tank 202 and the fuel vapor canister 242 without a tank pressure control valve being present. The pressure sensor 244 is still present between the fuel tank and the magnetically latching valve 100. In the normal gasoline or ethanol fuel systems, it is a canister vent valve 268' that controls the fluid communication between the fuel vapor canister 242 and atmosphere.

One advantage of the magnetic latching valve 100 is its compactness and overall low weight. The solenoid within the magnetic latching valve 100 has a 3 mm armature stroke, in contrast to commercially available mechanical latching valves which require a larger amount of power to overcome a 7 mm armature stroke. Secondly, the magnetic latching valve 100 holds itself, unpowered, in both the open position and the closed position after single pulses of voltage to the solenoid. The permanent magnet holds the armature and poppet in the open position. The spring biases the poppet, and hence the armature, in to the closed position. Third, the valve 100 maintains the fuel tank's integrity and allows enough flow into the carbon canister to prevent fuel nozzle shut offs or premature shut-offs (PSOs) during refueling. This is possible because of the presence of the spring, which seals the valve closed after a voltage pulse to the solenoid. The spring holds the valve in a fully sealed, closed position up to a specified pressure, where it will mechanically relieve the pressure at a given set point based on the spring rate.

The valve includes a main sealing surface and a lip, to include a flexible secondary sealing surface in the event of a failure of the primary surface.

In comparison to mechanical latching (indexing) valves, the magnetic latching valve 100 has fewer moving parts and has considerably lower noise, vibration, and harshness (NVH) due to removing the mechanical latching indexing components. Also, there are less potential failure modes because of the reduction in the number of moving components as well as the total number of components.

It should be noted that the embodiments are not limited in their application or use to the details of construction and arrangement of parts and steps illustrated in the drawings and description. Features of the illustrative embodiments, constructions, and variants may be implemented or incorporated in other embodiments, constructions, variants, and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

Having described the invention in detail and by reference to preferred embodiments thereof, it will be apparent that modifications and variations are possible without departing from the scope of the invention which is defined in the appended claims.

What is claimed is:

1. A system for refueling a vehicle having an internal combustion engine, the system comprising:
    a fuel tank in fluid communication with a filling tube;
    a fuel vapor canister in fluid communication with the fuel tank;
    a magnetic latching valve having an inlet port in fluid communication with the fuel tank and an outlet port in fluid communication with the fuel vapor canister, the magnetic latching valve comprising:
        a main housing consisting of a base and a cover mated with a fluid tight seal and defining a chamber in fluid communication with the inlet port and the outlet port, wherein the base comprises a solenoid housing seated therein and mated thereto;
        a solenoid seated within the solenoid housing, the solenoid having a first end and a second end;
        a stop positioned proximate the first end of the solenoid;
        a linearly translatable armature seated within the solenoid, the armature having a first end mateable with the stop and having a second end connected to a poppet valve, wherein the armature is commandedly moveable between an open position in which the first end of the armature is against the stop and a closed position, respectively, after a pulse of voltage to the solenoid;
        a permanent magnet fixedly seated within the housing, wherein the permanent magnet is juxtaposed to the stop to magnetically latch and hold the armature in the open position; and
        a spring seated around the connection of the armature to the poppet valve with a first end of the spring against the poppet valve and a second end of the spring against the main housing, wherein the spring biases the poppet valve closed when the armature is in the closed position and the spring is configured to be mechanically openable by fuel vapor pressure to prevent fuel tank rupture;
        wherein the solenoid is configured to be off after the armature is linearly translated to either of the open position or the closed position;
    a controller in operative communication with the magnetic latching valve;
    a tank pressure control valve positioned in a bypass loop around the magnetic latching valve;
    an intake manifold of the internal combustion engine in fluid communication with the fuel vapor canister via a conduit connecting the fuel vapor canister to the intake manifold;
    a turbocharger or supercharger upstream of the intake manifold;
    a Venturi device in a bypass around the turbocharger or supercharger, wherein the Venturi device has a suction port in fluid communication with the fuel vapor canister; and
    a canister purge valve controlling fluid communication between the fuel vapor canister and the intake manifold;
    wherein the suction port of the Venturi device is upstream of the canister purge valve relative to the canister purge valve's position in the conduit between the fuel vapor canister and the intake manifold;
    wherein the controller opens the magnetic latching valve during vehicle refueling and closes the magnetic latching valve during normal operation.

2. The system of claim 1, wherein the solenoid is in electrical communication with a plug or a plug receptacle in the main housing of the magnetic latching valve and the plug or the plug receptacle is connected to a mating electrical connector in electrical communication with the controller.

3. The system of claim 1, wherein the controller includes an H-bridge control system that reverses the polarity of the solenoid to move the armature between the open position and the closed position.

4. The system of claim 1, wherein the internal combustion engine is a hybrid internal combustion engine.

5. The system of claim 1, wherein a spring rate of the spring is configured to prevent fuel nozzle shut offs during refueling.

6. The system of claim 1, wherein the armature has a 3 mm armature stroke.

7. The system of claim 1, wherein the base of the main housing defines a plug or a plug receptacle in electrical communication with the solenoid.

8. The system of claim 1, wherein the spring is a coil spring.

9. The system of claim 8, wherein the spring is a conically shaped coil spring.

* * * * *

UNITED STATES PATENT AND TRADEMARK OFFICE
CERTIFICATE OF CORRECTION

| | |
|---|---|
| PATENT NO. | : 11,835,018 B2 |
| APPLICATION NO. | : 17/446842 |
| DATED | : December 5, 2023 |
| INVENTOR(S) | : Dave Fletcher et al. |

It is certified that error appears in the above-identified patent and that said Letters Patent is hereby corrected as shown below:

On the Title Page

Page 2, Item (56), Line 22, "9,827,963 B2 11/2017 Fletchet et al." should read --9,827,963 B2 11/2017 Fletcher et al.--

Signed and Sealed this
Thirtieth Day of January, 2024

*Katherine Kelly Vidal*

Katherine Kelly Vidal
*Director of the United States Patent and Trademark Office*